(12) United States Patent  (10) Patent No.: US 8,607,975 B2
Tai et al.  (45) Date of Patent: Dec. 17, 2013

(54) CASE FOR PORTABLE ELECTRONIC DEVICE

(75) Inventors: Hitomi Tai, Tokyo (JP); Yuko Hirayama, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 147 days.

(21) Appl. No.: 13/251,649

(22) Filed: Oct. 3, 2011

(65) Prior Publication Data

US 2012/0305423 A1  Dec. 6, 2012

(30) Foreign Application Priority Data

Jun. 6, 2011 (JP) ................................ 2011-126790

(51) Int. Cl.
*B65D 85/00* (2006.01)
(52) U.S. Cl.
USPC ......................................... 206/320; 150/154
(58) Field of Classification Search
USPC ............... 206/320, 316.2, 521; 150/154, 165; D3/303, 299, 300; 224/929
See application file for complete search history.

(56) References Cited

U.S. PATENT DOCUMENTS

| | | | | |
|---|---|---|---|---|
| D302,698 S | * | 8/1989 | Rexroat et al. ................ | D19/26 |
| D467,079 S | * | 12/2002 | Willows et al. ............... | D3/303 |
| D532,199 S | * | 11/2006 | Balchunas et al. ............ | D3/303 |
| D588,359 S | * | 3/2009 | Gonzalez ...................... | D3/243 |
| D592,400 S | * | 5/2009 | Nelson ........................... | D3/303 |
| D594,659 S | * | 6/2009 | Lown et al. .................... | D3/299 |
| D598,650 S | * | 8/2009 | Lown et al. .................... | D3/267 |
| D599,546 S | * | 9/2009 | Lown et al. .................... | D3/267 |
| D621,617 S | * | 8/2010 | Austin ........................... | D3/299 |
| D624,318 S | * | 9/2010 | Williams et al. .............. | D3/299 |
| D630,246 S | * | 1/2011 | Franklin ........................ | D19/26 |
| D652,624 S | * | 1/2012 | Elvin ............................. | D3/299 |
| 2007/0202956 A1 | | 8/2007 | Ogasawara | |

* cited by examiner

*Primary Examiner* — Steven A. Reynolds
(74) *Attorney, Agent, or Firm* — Matthew B. Dernier, Esq.; Gibson & Dernier LLP

(57) ABSTRACT

An electronic device can be inserted into a pocket formed with a main cover through between a side cover and the main cover. A part of the electronic device where an operating stick is formed can be stored in a flap formed with the side cover. The upper end of the flap rim of the side cover is positioned further away from the center line C1 of the case than the lower end is. The pocket rim of the main cover gets closer to the center line C1 of the case as it goes from the upper end to the lower end. According to a case including the main cover and the side cover, insertion/removal work of the electronic device can be facilitated, undesired exposure of the electronic device can be prevented, and a load applied to the operating stick can be readily reduced.

10 Claims, 4 Drawing Sheets

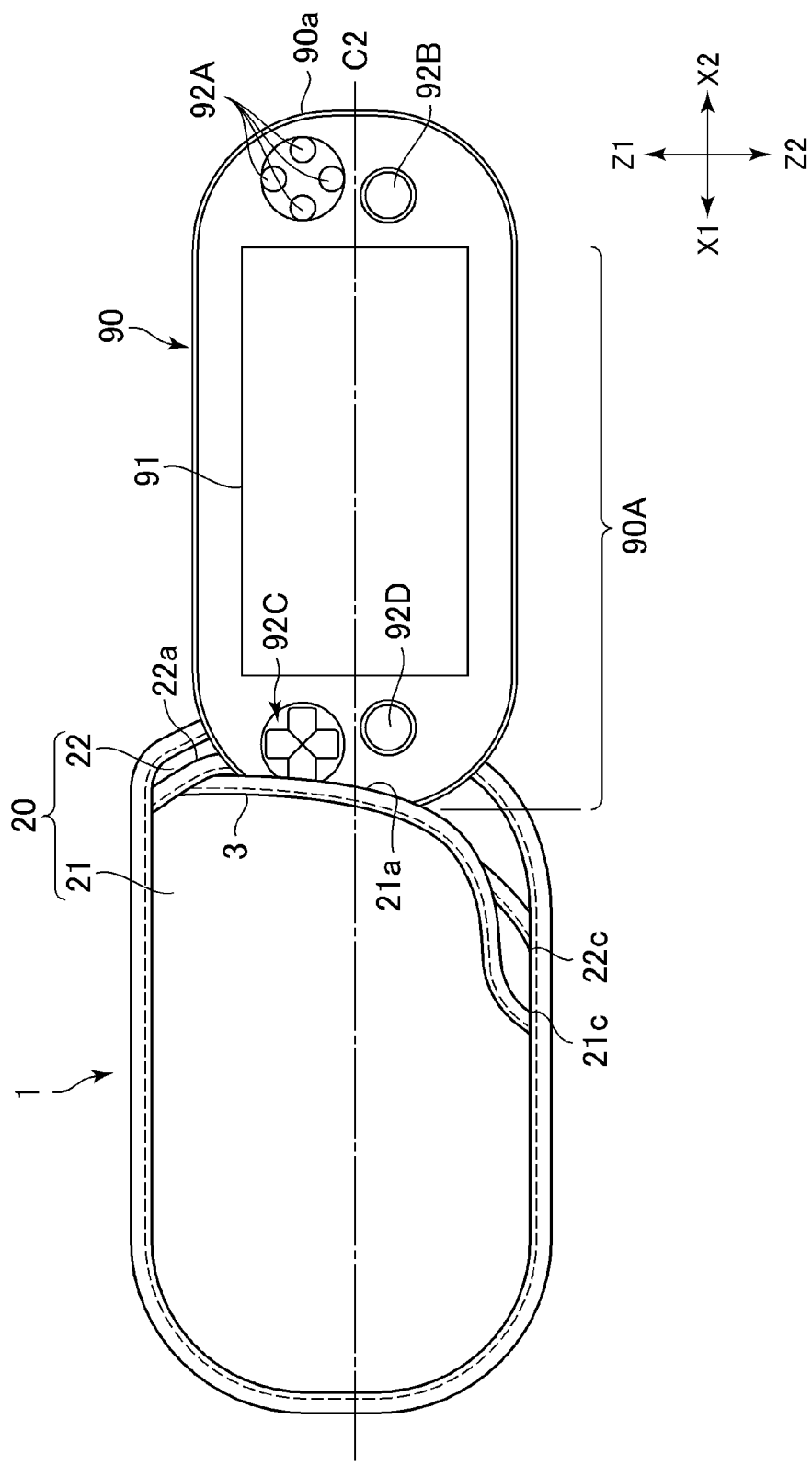

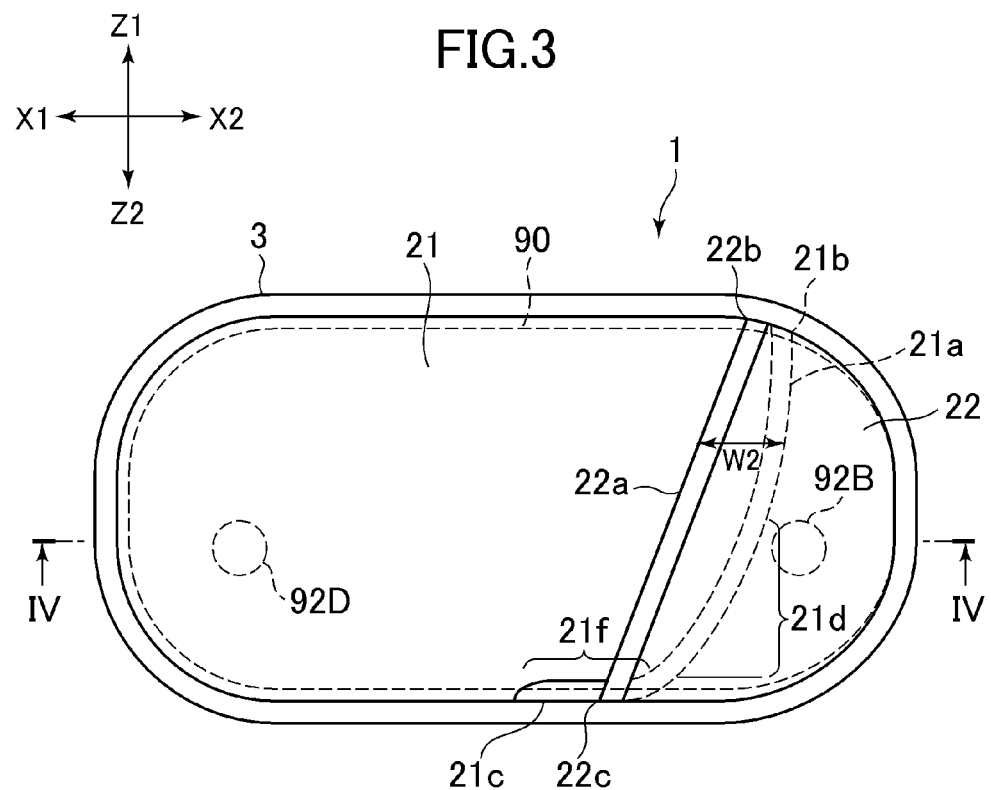
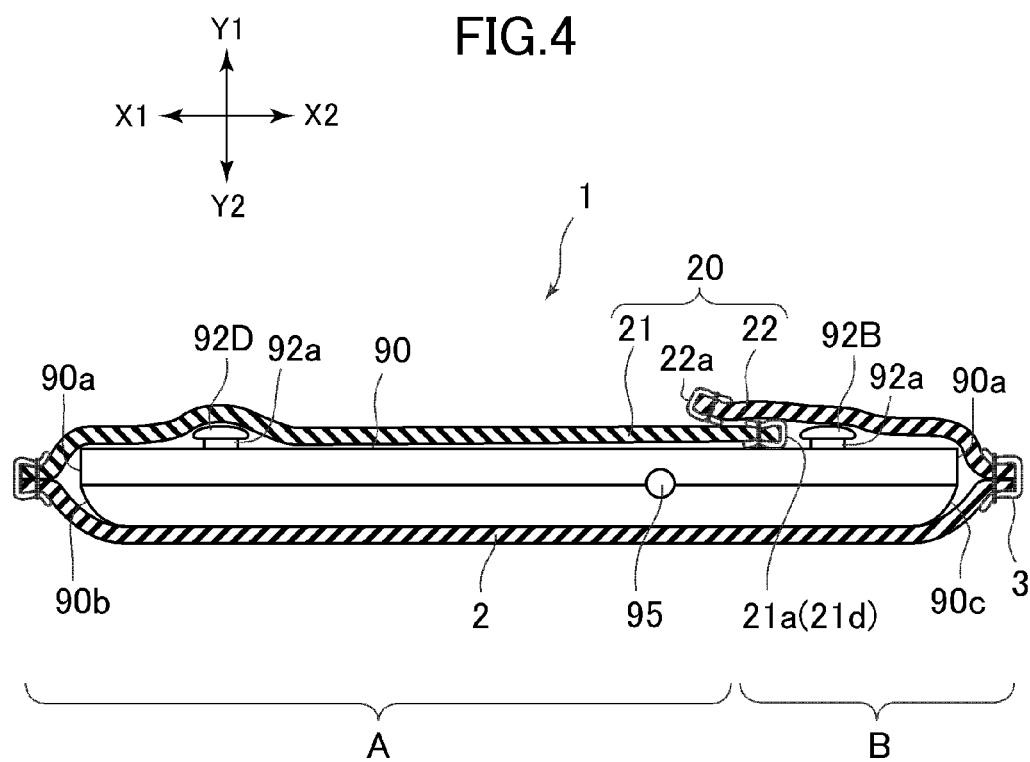

CASE FOR PORTABLE ELECTRONIC DEVICE

CROSS-REFERENCE TO RELATED APPLICATION

The present application claims priority from Japanese application JP2011-126790 filed on Jun. 6, 2011, the content of which is hereby incorporated by reference into this application.

BACKGROUND OF THE INVENTION

1. Field of the Invention

The present invention relates to a case of a portable electronic device that is made of stretch material.

2. Description of the Related Art

Portable electronic devices having, on the front surface thereof, a display screen and an operating stick arranged on at least one of the right and left sides of the display screen have been used (see U.S. Patent Application Publication No. 2007/0202956 as an example). The operating stick projects from the front surface of the electronic device. Conventionally, special cases for the electronic device, which is made of stretch material, may be used to protect the electronic device.

SUMMARY OF THE INVENTION

However, when a case having a size matching an electronic device is used, it may be possible, depending on the shape of the case, that the operating stick of an electronic device held inside be held being inclined. This is not preferable for the support mechanism of the operating stick.

According to one aspect of the present invention, there is provided a case for storing a portable electronic device by utilizing stretchability of the case. The electronic device includes a display screen on a front surface thereof, an operating stick arranged on the front surface and positioned on either one side of right and left sides of the display screen, a first part forming as a part on the one side of the electronic device and having the operating stick, and a second part forming a remaining part of the electronic device and having the display screen. The case comprising a back cover for covering a rear surface of the electronic device, and a front cover for covering the front surface of the electronic device. The front cover includes a side cover for covering the first part, and a main cover for covering the second part. The main cover, together with the back cover, forms a pocket capable of storing the second part so that the second part can be inserted into, and removed from, the pocket through between the main cover and the side cover, and includes a pocket rim defined as a rim of the pocket. The side cover, together with the back cover, forms a flap capable of storing the first part, and includes a flap rim defined as a rim overlapping the main cover. One end of the flap rim is positioned further away from a center line defining a center of the case in an insertion/removal direction for the pocket, compared with another end of the flap rim. One end of the pocket rim, which is defined as an end toward the one end of the flap rim, is positioned further away from the center line compared with another end of the pocket rim in the insertion/removal direction. The pocket rim gets closer to the center line as it goes from the one end to the other end.

According to the above case, it is possible to prevent an electronic device from being exposed when not desired, and to readily reduce a load applied to the operating stick, while facilitating the insertion/removal work of the electronic device. That is, according to the case, the second part of the electronic device is inserted into the pocket formed with the main cover through between the side cover and the main cover, and the first part of the electronic device is stored in the flap. This can prevent the electronic device from being exposed when not desired. Further, one end of the flap rim is positioned further away from the center line defining a center of the case in the insertion/removal direction, compared with another end of the flap rim, and this arrangement can facilitate insertion/removal work of the electronic device, compared to a structure in which the two ends are positioned equidistance from the center line. Further, the pocket rim gets closer to the center line of the case as it goes from the one end to the other end, and this arrangement can readily lead to a design that ensures the pocket rim does not abut on the operating stick.

BRIEF DESCRIPTION OF THE DRAWINGS

FIG. 2 is a front view showing a process where the electronic device is inserted into the case;

FIG. 3 is a font view showing the case with an electronic device stored therein;

FIG. 4 is a cross sectional view of the case along the line IV-IV shown in FIG. 3.

DETAILED DESCRIPTION OF THE INVENTION

Figure 1:
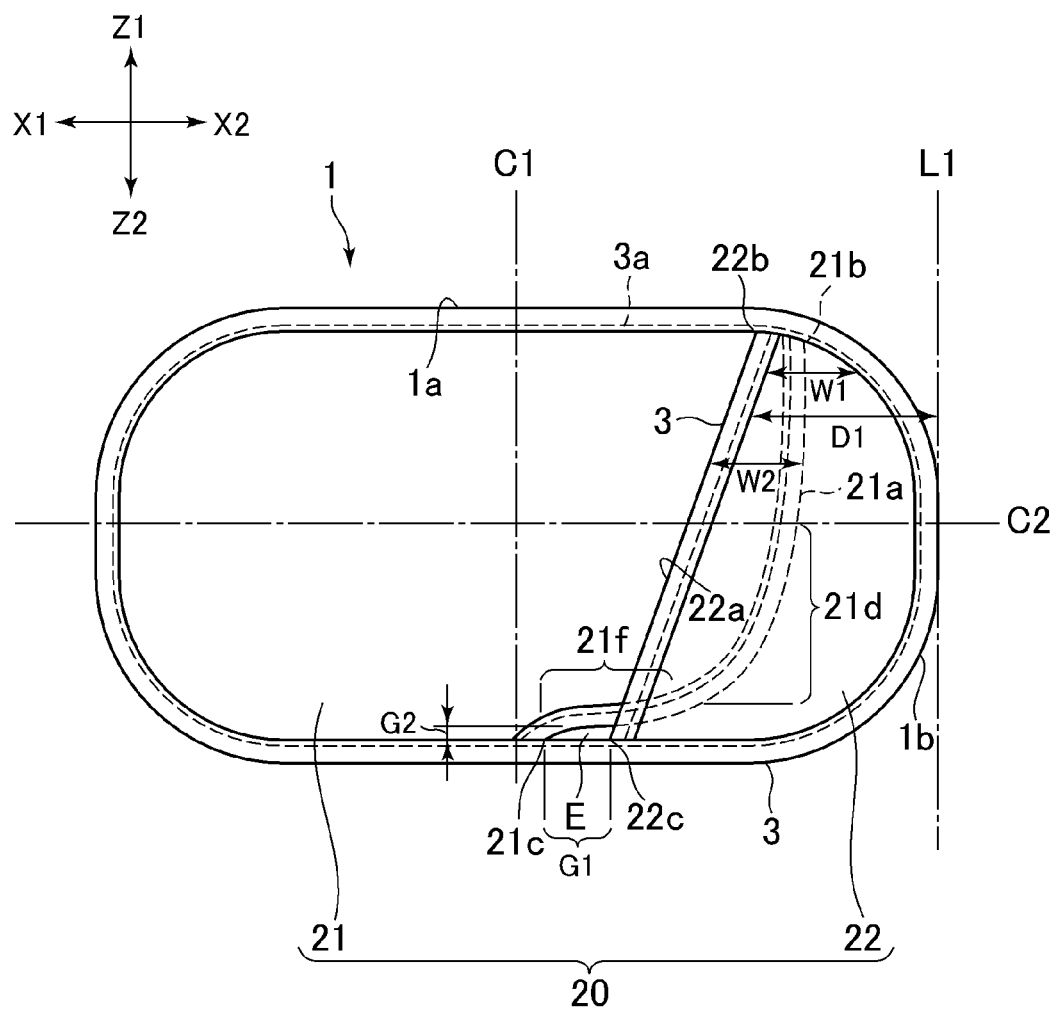
FIG. 1 is a front view of a case according to one embodiment of the present invention.
Figure 5:
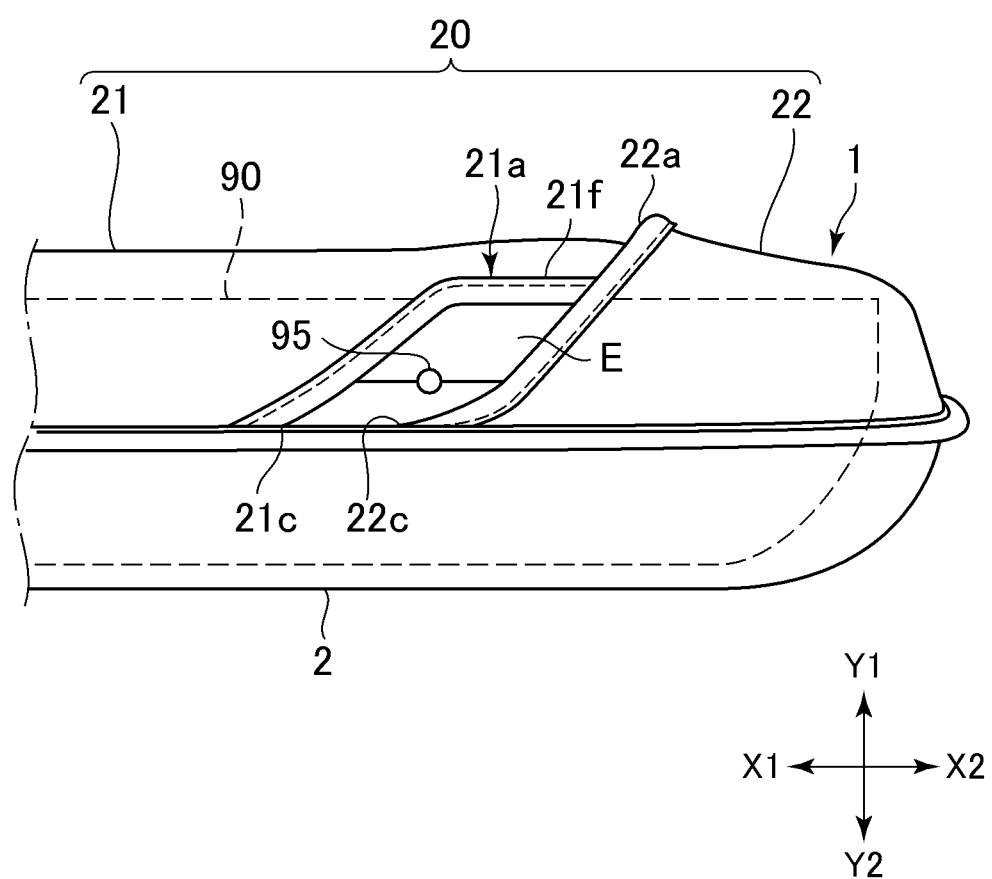
FIG. 5 is a bottom view showing the lower surface of the electronic device stored in the case.

In the following, one embodiment of the present invention will be described with reference to the accompanying drawings. FIG. 1 is a front view of a case 1 according to one embodiment of the present invention. FIG. 2 is a front view showing a process where the electronic device 90 is inserted into the case 1. FIG. 3 is a front view of the case 1 with the electronic device 90 stored therein. FIG. 4 is a cross sectional view of the case 1 along the line IV-IV shown in FIG. 3. FIG. 5 is a bottom view showing the lower surface of the electronic device 90 stored in the case 1.

In the following description, the directions X1 and X2 shown in FIG. 1 correspond to the left and right directions, respectively, and the directions Z1 and Z2 correspond to the up and down directions, respectively. Further, the directions Y1 and Y2 shown in FIG. 4 correspond to the forward and rearward directions, respectively.

As shown in FIG. 2, the electronic device 90 in this embodiment is a device having a shape of a substantially rectangular solid that is long in the left-right direction. The electronic device 90 has a display screen 91 on the front surface thereof. The electronic device 90 in this example functions as a game device, a motion image reproducing device, and a communication device, and thus includes, on the left and right of the display screen 91, a plurality of operating members for user operation. Specifically, a plurality of operation buttons 92A and an operating stick 92B are arranged on the right of the display screen 91. A directive key 92C having a cross shape as a whole and an operating stick 92D are arranged on the left of the display screen 91. These operating members 92A to 92D project from the front surface of the electronic device 90. The operating members 92B, 92D each include an stem 92a projecting from the front surface of the electronic device 90 (see FIG. 4) and further are adapted to inclination in the radius direction thereof, such as the up-down direction (Z1-Z2 direction), the left-right direction (X1-X2 direction) and so forth, and rotation along the circumferential direction while being inclined. The operating sticks 92B, 92D may be slidable in the radius direction of the stem 92a. The height in projection of the operating sticks 92B, 92D is larger than that of the operation button 92A and the directive key 92C.

The case 1 is a case for storing the electronic device 90. The case 1 and the electronic device 90 may be together used as a single device when the electronic device 90 is stored in the case 1. As shown in FIGS. 1 and 4, the case 1 includes a back cover 2 for covering the rear surface of the electronic device 90 and a front cover 20 for covering the front surface of the electronic device 90. These two covers 2, 20 are made of stretch sheet material. For example, the cover 2, 20 is made of rubber (e.g., chloroprene rubber) or the like that has flexibility and cushioning properties as well as strechability. The cover 2, 20 has a shape in conformity with the electronic device 90. The electronic device 90 in this example has a lateral surface 90a that is curved into an arc shape (see FIG. 2), while the left and right edges of the case 1 are also curved into an arc shape. The case 1 has a size in conformity with the electronic device 90. Specifically, the size of the cover 2, is slightly smaller than that of the electronic device 90 in a front view of the cover 1. Accordingly, the cover 2, 20 is slightly stretched when the electronic device 90 is stored in the case 1.

As shown in FIGS. 1 and 4, the front cover 20 includes a side cover 22 and a main cover 21. The side cover 22 can cover the front surface on a right side part (a first part in claims) of the electronic device 90 where the operating stick 92B is arranged. Meanwhile, the main cover 21 covers the front surface of the remaining part (a second part in claims) of the electronic device 90, that is, the front surface on a left side part of the electronic device 90 and the display screen 91. Accordingly, the main cover 21 has a larger left-right width than that of the side cover 22.

As shown in FIG. 4, the main cover 21, together with the back cover 2, forms a pocket A in which the remaining part of the electronic device 90, that is, a part other than the right side part of the electronic device 90, can be stored (the remaining part of the electronic device 90 being hereinafter referred to as a pocket-storing part 90A (see FIG. 2)). Meanwhile, the side cover 22, together with the back cover 2, forms a flap B in which the right side part of the electronic device 90 can be stored. As shown in FIG. 2, the electronic device 90 can be inserted into, and removed from, the pocket A through between the main cover 21 and the side cover 22. Specifically, in inserting the electronic device 90, the side cover 22 is folded backward relative to the main cover 21 to thereby widen the space between the side cover 22 and the main cover to have the inlet of the pocket A appear. Then, the pocket-storing part 90A of the electronic device 90 is inserted into the pocket A from the inlet. Then, while utilizing the strechability of the side cover 22, the side cover 22 is brought to cover the right side part of the electronic device 90. Meanwhile, in removing the electronic device 90, while utilizing the strechability of the side cover 22, the side cover 22 is folded backward with respect to the main cover 21 so that the right side part of the electronic device 90 is exposed out of the flap B. Then, the electronic device 90 is removed from the pocket A.

As shown in FIGS. 1 and 4, the main cover 21 includes a pocket rim 21a that functions as a rim of the opening of the pocket A. Meanwhile, the side cover 22 includes a flap rim 22a which overlaps the main cover 21. That is, the flap rim 22a is positioned on the front side of the main cover 21. As the flap rim 22a overlaps the main cover 21, the entire front surface of the electronic device 90 can be covered. Further, as a space is widely opened between the pocket rim 21a and the flap rim 22a, it is possible to insert or remove the electronic device 90 with respect to the pocket A, as described above.

In this regard, a rim of the main cover 21 other than the pocket rim 21a is connected to the outer rim of the back cover 2, and that a rim of the side cover 22 other than the flap rim 22a is connected to the outer rim of the back cover 2. In this example, the main cover 21, the side cover 22, and the back cover 2 are separate sheet members before manufacturing the case 1, and the rim of the main cover 21 and that of the side cover 22 are sewn onto the outer rim of the back cover 2. The rims of the covers 2, 21, 22 in this example are bordered by a bias tape 3. A thread 3a for sewing the bias tape 3 is shown in FIG. 1.

As shown in FIG. 1, one end (the upper end in this example) 22b of the a pocket rim 22a is positioned further away from the center line C1 defining a center of the case 1 in the insertion/removal direction (the left-right direction in this example) of the electronic device 90 with respect to the pocket A, compared with the other end 22c (the lower end in this example) (the insertion/removal direction being hereinafter simply referred to as a left-right direction). Accordingly, a width by which the side cover 22 covers the electronic device 90, that is, the width W1 in the left-right direction, is shorter in the upper part of the side cover 22. This consequently facilitates works of covering the right side part of the electronic device 90 with the side cover 22 and exposing the right side part of the electronic device 90 out of the side cover 22. In this regard, the center line C1 is defined as a straight line passing through the center of the case 1 in the insertion/removal direction of the electronic device 90 and being parallel to a flat surface including the case 1.

The flap rim 22a in this example is formed substantially linear and diagonal relative to the left-right direction. Accordingly, the distance D1 between the flap rim 22a and a straight line L1 that extends along a right end of the case 1 and is parallel to the center line C1 becomes gradually shorter as it goes upward. With the linear shape of the flap rim 22a, the flap rim 22a can become taut when the electronic device 90 is stored. As a result, the linear flap rim 22a can be prevented from being opened when the electronic device 90 is stored.

As shown in FIG. 1, the outer circumferential rim of the case 1 in this example is shaped in conformity with the shape of the electronic device 90, specifically comprising a linear part 1a extending linear in the longitudinal direction (the left-right direction) of the electronic device 90 and a curved part 1b extending downward from the linear part 1a while being curved. The upper end 22b of the flap rim 22a is positioned at the boundary between the linear part 1a and the curved part 1b. This arrangement facilitates a work of covering the right side part of the electronic device 90 with the side cover 22 and exposing the right side part of the electronic device 90 out of the side cover 22, compared to a shape with the upper end 22b positioned on the linear part 1a.

The electronic device 90 in this example has the lateral surface 90a that is curved as described above. Such a shape of the electronic device 90 facilitates a work of covering the right side part of the electronic device 90 with the side cover 22 and removing the side cover 22 from the right side part of the electronic device 90. Further, the rear surface of the electronic device 90 in this example is curved in its outer circumferential part 90c, as shown in FIG. 4. Such a shape of the rear surface further facilitates a work of covering the right side part of the electronic device 90 with the side cover 22.

As shown in FIG. 1, the pocket rim 21a of the main cover 21 is hidden under the side cover 22. One end (an end overlapped by the one end 22b of the flap rim 22a) of the pocket rim 21a is positioned further away from the center line C1 of the case 1 compared with the other end of the pocket rim 21a. The operating stick 92B of the electronic device 90 in this example is arranged in a position lower than the center line C2 in the up-down direction of the electronic device 90. In this example, the lower end 21c of the pocket rim 21a is positioned closer to the center line C1 than the upper end 21b is so that the main cover 21 avoid the operating stick 92B. In other words, the upper end 21b of the pocket rim 21a is positioned further away from the center line C1 of the case 1 than the lower end 21c is. Further, the pocket rim 21a get closer to the center line C1 of the case 1 as it goes from the upper end 21b to the lower end 21c. Moreover, the upper end 22b of the flap rim 22a as well is positioned further away from the center line C1 than the lower end 22c is, as described above. The above described shapes of the flap rim 22a and the pocket rim 21a can readily lead to a design of the case 1 that ensure the pocket rim 21a does not abut on the operating stick 92B, while facilitating insertion/removal work of the electronic device 90 and protecting the front surface of the electronic device 90 (see FIG. 3). Specifically, because the width W1 (see FIG. 1) in the left-right direction is shorter in the upper part of the side cover 22, insertion/removal work of the electronic device 90 can be facilitated. Further, because the pocket rim 21a get closer to the center line C1 of the case 1 toward the lower end 21c, designing to have the pocket rim 21a avoid the operating stick 92B can become easier. Moreover, because the width W1 is bigger in the lower part of the side cover 22, the side cover 22 and the main cover 21 can cover all area in the front surface of the electronic device 90 though the width in the left-right direction of the main cover 21 is shorter in its lower part. Moreover, in this example, as shown in FIG. 1, the upper end 22b of the flap rim 22a is positioned closer to the center line C1 of the case 1 than the upper end 21b of the pocket rim 21a is. That is, the side cover 22 overlaps the upper end 21b of the pocket rim 21a. This makes it easier to surely prevent exposure of the front surface of the electronic device 90.

As shown in FIG. 1, the pocket rim 21a includes a curved part 21d on a lower part thereof that is curved toward the center line C1 of the case 1. Such a shape of the pocket rim 21a can further readily lead to a design of the case 1 that ensures the pocket rim 21a does not abut on the operating stick 92B. Moreover, curving the pocket rim 21a in the curved part 21d allows the pocket rim 21a to include an extending part 21f, to be described later, that extends in the left-right direction.

As shown in FIGS. 3 and 4, when the electronic device 90 is stored in the case 1, the curved part 21d of the pocket rim 21a is positioned closer to the center line C1 of the case 1 than the operating stick 92B is. This can prevent the operating stick 92B from being inclined rightward by the pocket rim 21a. The electronic device 90 also has the operating stick 92D, as described above, positioned to the left of the display screen 91. When the electronic device 90 is stored in the case 1, the operating stick 92D is covered by the main cover 21. In such a condition, the majority of a force applied to the operating stick 92D by the main cover 21 is to press the operating stick 92D toward the electronic device 90, and thus a force for inclining the operating stick 92D is limited.

As shown in FIG. 1, the side cover 22 has an overlap width W2 by which the side cover 22 overlaps the main cover 21. The overlap width in the middle part (that is, the middle in the up-down direction) of the flap rim 22a is larger than that on the upper end 22b of the flap rim 22a. This arrangement of the side cover 22 and the main cover 21 makes it easier to prevent the overlap width W2 from disappearing even when the electronic device 90 is stored. In detail, when the electronic device 90 is stored, the side cover 22 is stretched due to the thickness of the electronic device 90, and accordingly, the middle part of the flap rim 22a moves relatively in the right direction relative to the pocket rim 21a. As a result, the overlap width W2 is reduced (see FIG. 3). However, in this example, because the overlap width at the middle part of the flap rim 22a is wider than that on the upper end 22b of the flap rim 22a, exposure of the front surface of the electronic device 90 due to reduction of the overlap width can be more readily prevented. In this regard, because the upper end 22b and the lower end 22c of the flap rim 22a are connected to the rim of the back cover 2, the overlap width on the upper end 22b and the lower end 22c can be prevented from reducing.

In this example in particular, the flap rim 22a and the pocket rim 21a are formed such that the overlap width W2 therebetween becomes gradually larger as it goes from the upper end 22b, 21b toward the lower end 22c, 21c. Specifically, in this example, as shown in FIG. 1, the overlap width W2 keeps increasing as it goes from the upper end 22b, 21b to an area lower than the center line C2 in the up-down direction. In order to increase the overlap width W2, the flap rim 22a is formed more sharply diagonal relative to the direction along the center line C1, that is, the up-down direction, than the pocket rim 21a is.

As shown in FIG. 1, a gap G1 in the left-right direction is defined between the lower end 21c of the pocket rim 21a and the lower end 22c of the flap rim 22a. That is, the lower end 21c of the pocket rim 21a is positioned closer to the center line C1 of the case 1 than the lower end 22c of the flap rim 22a is. The gap G1 constitutes an opening E enclosed by the flap rim 22a, the pocket rim 21a, and the rim of the back cover 2. The opening E is directed downward when the electronic device 90 is stored, as shown in FIG. 5, so that the lower surface of the electronic device 90 can be partially exposed through the opening E. A connector 95 is formed on the lower surface of the electronic device 90. The connector 95 can be exposed through the opening E. In this regard, the connector 95 is, e.g., a headphone jack, but alternatively, may be a charge connector of the electronic device 90.

As described above, the pocket rim 21a has the curved part 21d. As shown in FIG. 1, the pocket rim 21a is curved in the curved part 21d toward the center line C1 of the case 1, and thereafter extends in the left-right direction toward the center line C1. That is, the pocket rim 21a has an extending part 21f that extends in the left-right direction between an end of the curved part 21d and the lower end 21c. The extending part 21f makes it easier to sufficiently ensure a width of the opening E in the left-right direction, that is, the gap G1. Accordingly, the connector 95 can be reliably exposed even if the electronic device 90 should move in the case 1. Further, the overlap width W2 between the side cover 22 and the main cover 21 becomes smaller at the time when the electronic device 90 is stored than the time when the electronic device 90 is not stored. The extending part 21f to the pocket rim 21a can prevent exposure of a lower side of the front surface of the electronic device 90 due to reduction of the overlap width W2.

The curved part 21d is designed to end in a position on the lower edge of the electronic device 90 stored. In other words, the gap G2 between the outer rim of the back cover 2 and the extending part 21f is designed to be positioned along the lower edge of the electronic device 90 stored (see FIG. 3). Therefore, the opening E is not seen in the front view of the case 1 when the electronic device 90 is stored, as shown in FIG. 3. Consequently, this makes it possible to protect the entire front surface of the electronic device 90, while keeping the connector 95 exposed downward.

As described above, according to the case 1, because the electronic device 90 is inserted into the pocket A through between the side cover 22 and the main cover 21, and the right side part of the electronic device 90 is covered by the flap B, the electronic device 90 can be prevented from being exposed out of the case 1 when not desired. Further, because the upper end 22b of the flap rim 22a is positioned further away from the center line C1 of the case 1 than the lower end 22c is, insertion and removal of the electronic device 90 can be easily performed, compared to a structure in which the two ends 22b, 22c are positioned equidistant from the center line C1. Further, the pocket rim 21a gets closer to the center line C1 of the case 1 as it goes from the upper end 21b to the lower end 21c, and this arrangement readily leads to a design that ensures the pocket rim 21a does not abut on the operating stick 92B.

Further, in the case 1, the upper end 22b of the flap rim 22a is positioned closer to the center line C1 of the case 1 than the upper end 21b of the pocket rim 21a. This arrangement makes it easier to prevent exposure of the front surface of the electronic device 90.

Further, the overlap width W2 between the side cover 22 and the main cover 21 is larger in the middle part of the rim 21a, 22a than on the upper end 22b, 21b. This arrangement of the side cover 22 and the main cover 21 makes it less likely that the front surface of the electronic device 90 stored is exposed.

Further, the pocket rim 21a includes has the curved part 21d that is curved toward the center line C1 of the case 1 and positioned toward the lower end 21c. This shape can further readily lead to a design that ensures the pocket rim 21a does not abut on the operating stick 92B.

Further, in the above description, the gap G1 is ensured between the lower end 21c of the pocket rim 21a and the lower end 22c of the flap rim 22a. This structure allows a component formed on the lower side of the electronic device 90 and usable when the electronic device 90 is stored to be exposed outside. Specifically, in the above description, the connector 95 formed on the lower surface of the electronic device 90 can be exposed. While the gap G1 is ensured between the lower end 21c of the pocket rim 21a and the lower end 22c of the flap rim 22a, the upper end 22b of the flap rim 22a is positioned closer to the center line C1 of the case 1 than the upper end 21b of the pocket rim 21a is. This can prevent unnecessary exposure.

Further, the pocket rim 21a is curved in the curved part 21d toward the center line C1 of the case 1, and thereafter extends toward the center line C1 in the left-right direction. This structure makes it easier to sufficiently ensure a width of the opening E through which to expose the connecter 95.

Further, the pocket rim 21a is positioned closer to the center line C1 of the case 1 than the operating stick 92B is, when the electronic device 90 is stored. This can prevent the pocket rim 21a from pressing the operating stick 92B.

Note that the present invention is not limited to the above described case 1, and various modifications are possible.

For example, although the flap rim 22a is formed linear in the above description, the middle of the flap rim 22a may be curved, e.g., toward the main cover 21.

Further, although the main cover 21 is sewed onto the back cover 2, and the side cover 22 as well is sewed onto the back cover 2, the main cover 21 and the back cover 2 may be integrally made using a single sheet of material. Further, the side cover 22 and the back cover 2 may be integrally made, using a single sheet of material.

Further, although the gap G1 is ensured between the lower end 22c of the flap rim 22a and the lower end 21c of the pocket rim 21a in the above description, this gap G1 may not be necessarily provided.

What is claimed is:

1. A case for storing a portable electronic device by utilizing stretchability of the case, the electronic device including a display screen on a front surface thereof, an operating stick arranged on the front surface and positioned on either one side of right and left sides of the display screen, a first part forming a part on the one side of the electronic device and having the operating stick, and a second part forming a remaining part of the electronic device and having the display screen, the case comprising:
    a back cover for covering a rear surface of the electronic device; and
    a front cover for covering the front surface of the electronic device, wherein:
    the front cover includes a side cover for covering the first part, and a main cover for covering the second part,
    the main cover, together with the back cover, forms a pocket capable of storing the second part so that the second part can be inserted into, and removed from, the pocket through between the main cover and the side cover, and includes a pocket rim defined as a rim of the pocket,
    the pocket rim of the main cover includes an extending part extending in an insertion/removal direction for the pocket along an outer peripheral rim of the back cover, such that a second gap is defined between the extending part and the outer peripheral rim of the back cover,
    the side cover, together with the back cover, forms a flap capable of storing the first part, and includes a flap rim defined as a rim overlapping the main cover,
    one end of the flap rim is positioned further away from a center line defining a center of the case in the insertion/removal direction for the pocket, compared with another end of the flap rim,
    one end of the pocket rim, which is defined as an end toward the one end of the flap rim, is positioned further away from the center line compared with another end of the pocket rim in the insertion/removal direction,
    a first gap is defined between the another end of the pocket rim and the another end of the flap rim, such that an opening is formed between the first and second gaps whereby access to a portion of the portable electronic device may be obtained, and
    the pocket rim gets closer to the center line as it goes from the one end to the other end.

2. The case according to claim 1, wherein the one end of the flap rim is positioned closer to the center line than is the one end of the pocket rim.

3. The case according to claim 1, wherein a width by which the side cover overlaps the main cover is larger at a middle of the pocket rim and a middle of the flap rim, respectively, than at the one ends thereof.

4. The case according to claim 1, wherein the pocket rim includes a curved part positioned toward the other end thereof and curved toward the center line.

5. The case according to claim 4, wherein the pocket rim is curved in the curved part toward the center line of the case and thereafter extends toward the center line in the insertion/removal direction.

6. The case according to claims 1, wherein the pocket rim is positioned closer to the center line than the operating stick is when the electronic device is stored.

7. The case according to claims 1, wherein:
    an outer circumferential rim of the case includes a linear part extending linearly in the insertion/removal direction and a curved part extending from the linear part in a direction perpendicular to the insertion/removal direction while being curved, and the one end of the flap rim is positioned at the boundary between the linear part and the curved part.

8. The case according to claims 3, wherein the width becomes gradually larger as such width goes from the one ends of the flap rim and the pocket rim, respectively, toward the other ends thereof.

9. The case according to claims 8, the flap rim is formed more sharply diagonal relative to the insertion/removal direction along the center line of the case than is the pocket rim.

10. The case according to claims 1, the flap rim is formed linear and diagonal relative to the insertion/removal direction.

* * * * *